(12) United States Patent
Tavares et al.

(10) Patent No.: US 7,258,000 B2
(45) Date of Patent: Aug. 21, 2007

(54) SCANNER AND METHOD FOR DETECTING PRESSURES ON A MEMBER

(75) Inventors: Matthew R. Tavares, Federal Way, WA (US); Don G. Morris, Renton, WA (US); Richard Basham, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/271,449

(22) Filed: Nov. 11, 2005

(65) Prior Publication Data

US 2007/0107508 A1 May 17, 2007

(51) Int. Cl.
*G01P 13/00* (2006.01)

(52) U.S. Cl. .................................................. 73/170.01

(58) Field of Classification Search ............. 73/861.66, 73/170.01, 170.11, 170.08
See application file for complete search history.

(56) References Cited

U.S. PATENT DOCUMENTS

| | | | |
|---|---|---|---|
| 3,930,412 A | 1/1976 | Mallon et al. | |
| 4,111,058 A | 9/1978 | Gross | |
| 5,457,630 A | 10/1995 | Palmer | |
| 5,737,222 A | 4/1998 | Palmer | |
| 5,817,950 A | * 10/1998 | Wiklund et al. | ......... 73/861.66 |
| 6,002,972 A | 12/1999 | Palmer | |
| 6,247,369 B1 | 6/2001 | Chapman et al. | |
| 6,752,020 B1 | 6/2004 | Sobotta et al. | |

OTHER PUBLICATIONS

Pressure Systems; NetScanner™ System 9116, Ethernet Intelligent Pressure Scanner; pp. 1-8.

* cited by examiner

*Primary Examiner*—Edward Lefkowitz
*Assistant Examiner*—Andre J. Allen
(74) *Attorney, Agent, or Firm*—Alston & Bird LLP

(57) ABSTRACT

A scanner and associated method for detecting pressures on a test member are provided. The scanner can be provided with an electronic module that includes an analog-digital (A/D) converter associated with each channel of the scanner and configured to provide digital signals representative of the pressures detected by pressure sensor elements associated with various locations on the test member. The electronic module can also include amplifiers and/or a multiplexer so that the output of the scanner provides an amplified and/or multiplexed digital output signal representative of the detected pressures. In some cases, the A/D converters and amplifiers can be provided in a single, mixed-signal chip of the scanner. The scanner can be small enough to be disposed in various locations in the test member, including small spaces that are generally incapable of accommodating conventional test equipment.

25 Claims, 5 Drawing Sheets

SCANNER AND METHOD FOR DETECTING PRESSURES ON A MEMBER

BACKGROUND OF THE INVENTION

1. Field of the Invention

This invention relates generally to a device and associated method for detecting pressures on a member, such as for measuring the pressures at a plurality of locations on a surface of a test member during wind tunnel testing, flight testing, or the like.

2. Description of Related Art

Wind tunnel testing is conventionally used for testing members such as vehicles and structures. For example, a portion of an aircraft or a full or partial model of an aircraft can be positioned in a wind tunnel and subjected to a flow of air to determine characteristics of the member. According to one typical testing method, pressures can be measured at a number of positions on the surface of the test member. For example, pressures can be detected on the wings, vertical or horizontal tail sections, or other portions of the test member. Surface pressures are also measured for full-scale flight testing of aircraft and other vehicles.

In one conventional method for monitoring generally static pressures on a test member, small pneumatic tubes are disposed throughout the test member to communicate pressure from various points of interest. For example, one end of each tube can be disposed at a surface of the test member, and the tube can extend through the test member to a scanning module. The scanning module includes a pressure sensor corresponding to each pneumatic tube, i.e., each channel of pressure measurement. Each pressure sensor provides an analog signal that is representative of the pressure in the corresponding pneumatic tube and, hence, the pressure at the corresponding point on the test member. The scanning module successively detects the pressure from each sensor, converts the analog signal to a digital signal, and multiplexes the signals for communication to another device for data recording and/or analysis.

In some cases, the number of pneumatic tubes that can be disposed on a particular test member is limited by the size of the devices. The size of each device also restricts the locations in which the devices can be provided. For example, the devices can be too large for mounting on small surfaces, in thin portions, or at sharp edges of the test member. In addition, the placement of each device requires a hole to be drilled in the test member and addition of a channel to route the pneumatic tube, thereby further limiting the number of devices that can be disposed on a single test member. Further, the size of the scanning module restricts the locations in which the scanning module can be provided. For example, conventional scanning modules typically measure more than several inches in each dimension and therefore are disposed in the test member at a location where a space of at least this size is available. Typically, the scanning module must be located remotely from some or all of the points of interest. For example, if a flap or aileron does not provide sufficient internal space for locating the scanning module, the scanning module is located remotely from the flap. The pneumatic lines must extend for some distance to the scanning module and, in some cases, the pneumatic lines must be disposed partially outside the test member, potentially interfering with the aerodynamic testing operation. For example, if the scanning module is located in a portion of the test member that is remote from a flap, pneumatic lines might extend from the module to the flap via a route that goes at least partially outside of the test member. The presence of the tubes outside of the test member can affect the measurements of the aerodynamic characteristics of the test member.

Thus, a need exists for an improved sensor device and associated method for performing such testing of a test member. The sensor device should be capable of being disposed at various locations on the test member and should provide accurate testing of the pressures at a number of locations throughout the test member.

SUMMARY OF THE INVENTION

The present invention provides a scanner and associated method for detecting pressures on a test member. The scanner can be provided with an electronic module that includes analog-to-digital (A/D) converters associated with each channel of the scanner and configured to provide digital signals representative of the pressures detected by pressure sensor elements associated with various locations on the test member. The scanner can be small enough to be disposed in various locations in the test member, including small spaces that are generally incapable of accommodating conventional test equipment.

According to one embodiment of the present invention, the scanner includes a manifold defining a plurality of channels. Each channel extends between a port on a first surface of the manifold and a header inlet so that each channel is configured to communicate a pressure at a respective one of the header inlets to a respective one of the ports. Tubes can extend from the manifold to provide a fluid connection between a respective one of the header inlets and a location remote from the manifold. Thus, by detecting pressures at the ports, the scanner can determine the pressures at the various locations throughout the test member. The manifold can define a ceramic body that defines the channels, and each of the channels can extend through the body in a nonlinear configuration between the respective port and header inlet. A pressure sensor element is configured to detect a pressure at each port. The scanner also includes an electronic module that is supported by the manifold and configured to communicate with the pressure sensor elements. The electronic module has a plurality of A/D converters, each of which is configured to communicate with a respective one of the pressure sensor elements and provide a digital signal that is representative of the pressure at each of the header inlets, and the digital signals are delivered to an output.

The A/D converters can be defined by a single integrated circuit. Amplifiers can also be provided for communicating with each of the A/D converters to deliver an amplified digital signal to the output, e.g., amplifying the analog output of the pressure sensor elements before digitizing or by amplifying the digital output of the A/D converters. The amplifiers can also be defined by a single integrated circuit, which can be the same integrated circuit that defines the A/D converters. A multiplexer can be configured to multiplex the digital signals from the A/D converters to provide a multiplexed signal via the output of the electronic module. In any case, the integrated circuit of the electronic module can be a mixed-signal chip that is adapted to perform both digital and analog operations.

The pressure sensor elements can be disposed in a cavity that is defined proximate the manifold by a housing and/or the manifold so that the pressure sensor elements are substantially sealed from an environment outside the cavity.

Each pressure sensor element can be disposed on a glass mounting block that is mounted on the manifold proximate the respective port, with the mounting block defining an orifice or bore therethrough for fluid communication between the respective port and the sensor element. The pressure sensor element can define a body and strain sensors disposed opposite the body from the mounting block. The strain sensors can be electrically connected to the electronic module, e.g., by a fixed bond between the pressure sensor element and the electronic module such as a wire bond connection. The scanner can also include one or more temperature sensors that provide a signal representative of the temperature of the pressure sensor elements for determining a temperature correction of the pressures at the header inlets according to the temperature of the pressure sensor elements. The temperature sensor, sensing also the bulk temperature of the device, can be used to correct for temperature characteristics of both the analog and digital electronics circuitry.

According to another embodiment of the present invention, a method of detecting pressures on a surface of a test member is provided. The method includes providing a scanner on the test member, the scanner having a manifold defining a plurality of channels. Each channel extends between a port on a first surface of the manifold and a header inlet in fluid communication with a plurality of locations on the test member so that each channel is configured to communicate a pressure at a respective one of the locations to a respective one of the ports. Pressures are detected at the ports with a plurality of pressure sensor elements. In particular, each pressure sensor element provides an analog signal representative of the pressure at a respective one of the ports. The analog signals are converted to digital signals in a plurality of A/D converters of an electronic module that is supported by the manifold. Thus, the digital signals are representative of the pressure at each of the header inlets. The A/D converters are configured to deliver the digital signals to an output of the electronic module, e.g., for further processing, analysis, monitoring, storing, communication, and/or other operations.

The A/D conversion can be performed in a single integrated circuit in the electronic module. The signals from the pressure sensor elements also can be amplified and filtered, and the resulting amplified digital signals can be provided at the output of the electronic module. The amplification can be performed in the same integrated circuit as the A/D conversion. In any case, the digital signals can be multiplexed to provide a multiplexed signal via the output of the electronic module. A signal representative of the temperature of the pressure sensor elements can also be generated and used to determine a temperature correction for the pressures at the header inlets.

Each pressure sensor element can be disposed on a glass mounting block mounted on the manifold proximate the respective port, the mounting block defining an orifice for fluid communication between the respective port and the sensor element, and the sensor element defining a body and strain sensors disposed opposite the body from the mounting block, each strain sensor being electrically connected to the electronic module. The pressure sensor elements can be connected, e.g., fixedly mounted, to the electronic module by a wire bond connection. The pressure sensor elements can be disposed proximate the manifold in a cavity defined by a housing and/or the manifold so that the pressure sensor elements are at least substantially sealed from an environment outside the cavity.

BRIEF DESCRIPTION OF THE DRAWINGS

Figure 1:
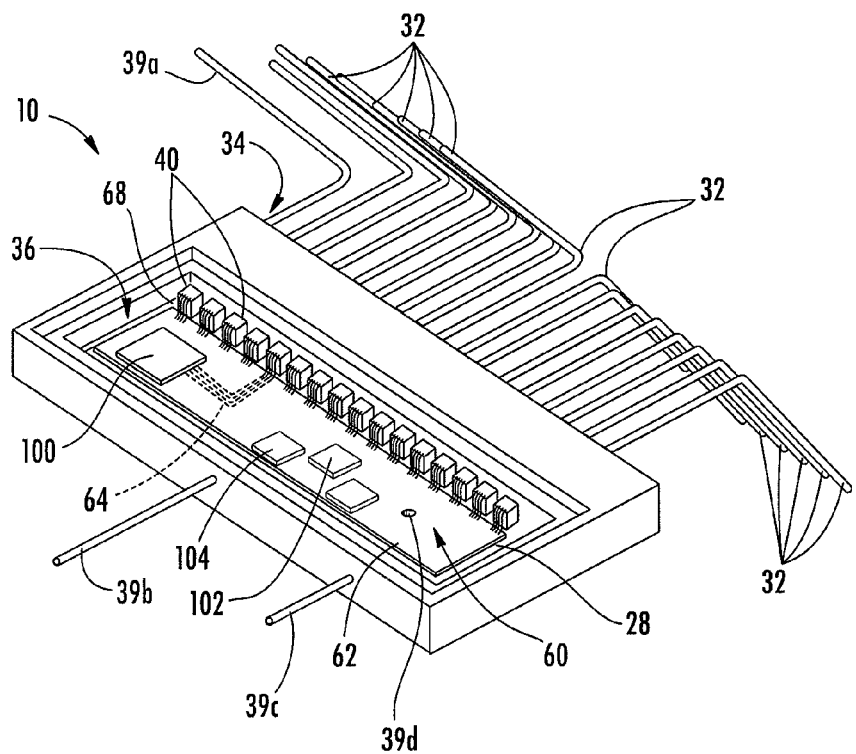
Figure 2:
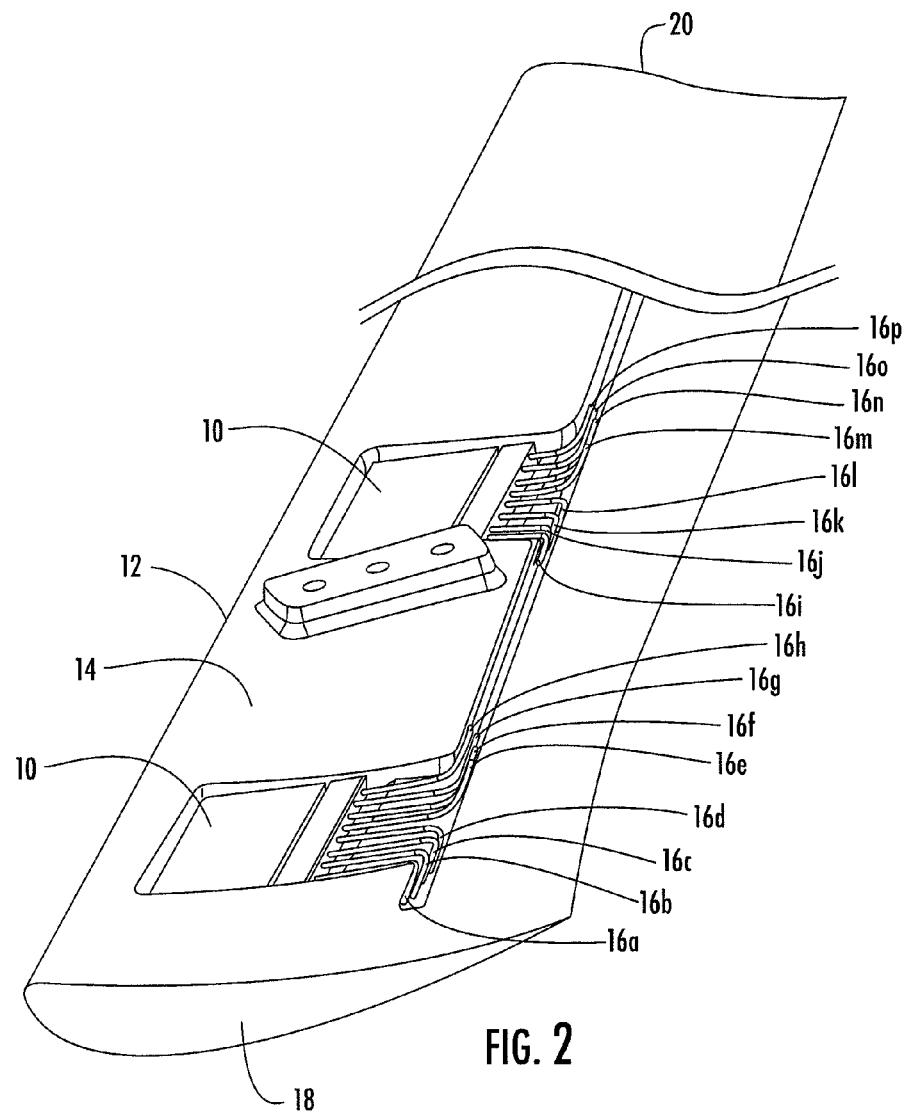
Figure 3:
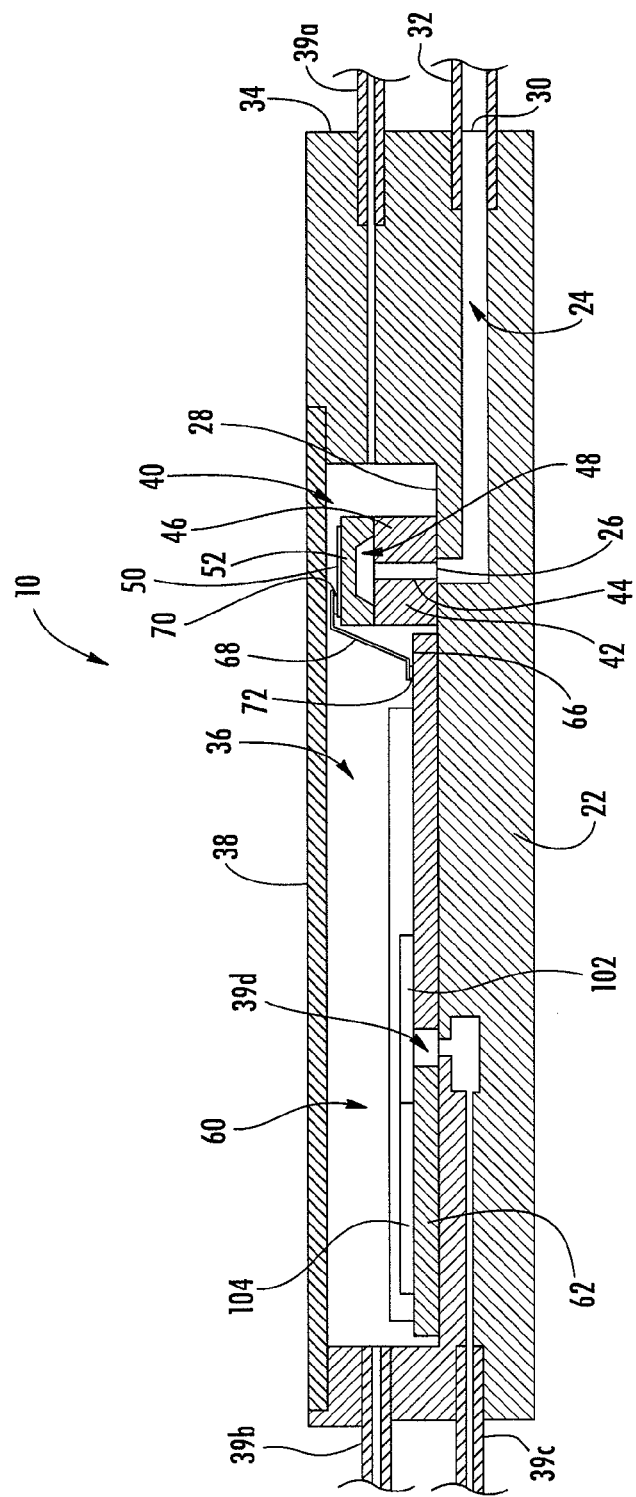
Figure 4:
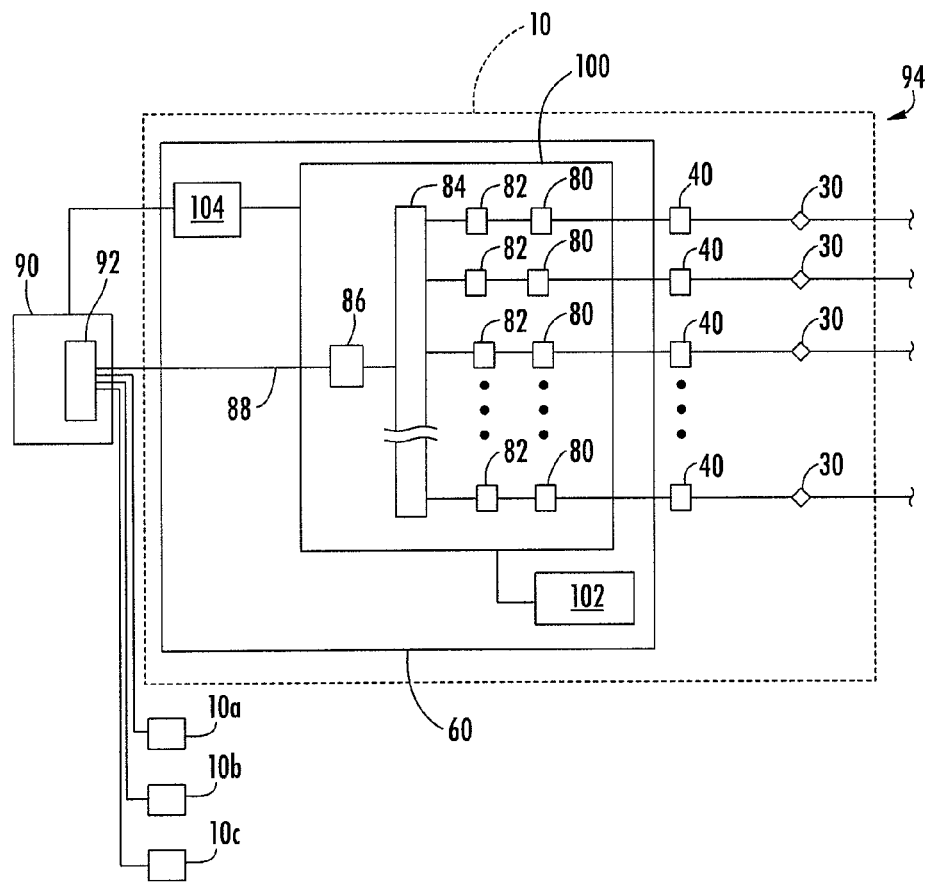
Figure 5:
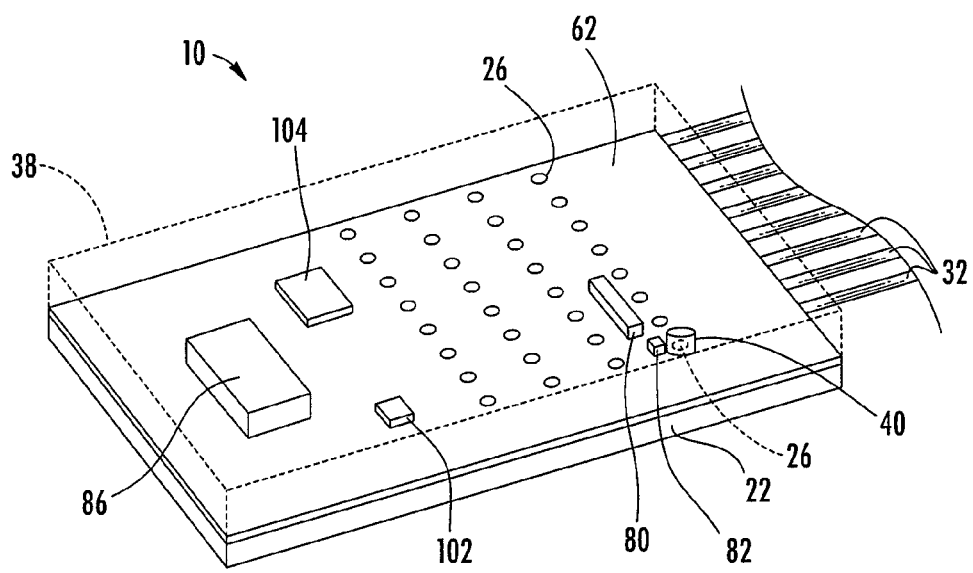

Having thus described the invention in general terms, reference will now be made to the accompanying drawings, which are not necessarily drawn to scale, and wherein:

FIG. 1 is a perspective view illustrating a scanner according to one embodiment of the present invention, shown with the housing removed;

FIG. 2 is a perspective view illustrating a test member with two scanners disposed therein for performing a pressure detection operation according to one embodiment of the present invention;

FIG. 3 is a section view illustrating the scanner of FIG. 1;

FIG. 4 is a block diagram schematically illustrating a system including the scanner of FIG. 1; and FIG. 5 is a perspective view illustrating a scanner according to another embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular, to FIG. 1, there is shown a scanner 10 according to one embodiment of the present invention that can be used to detect various pressures on a test member. In a typical manner of operation, the scanner 10 can be disposed in or on a test member 12 (FIG. 2) and used to detect pressures at various locations throughout the test member 12. The test member 12 can be any of various structures. For example, as shown in FIG. 2, the test member 12 can be a flap or aileron of an aircraft, and one or more of the scanners 10 can be disposed in the flap 12 and configured to detect the pressure at various locations on the flap 12 while the flap is subjected to testing. That is, as shown in FIG. 2, the scanners 10 can be configured to detect the pressure on the surface 14 of the flap 12 at various locations 16a-16p between the root 18 and tip 20 of the flap 12. In other embodiments, the test member 12 can be an aircraft or other portions of an aircraft, such as a wing, vertical or horizontal tail section, or the like. Pressures on the test member 12 can be measured while the member is subjected to operational conditions or simulated operational conditions, such as by subjecting the test member to winds in a wind tunnel or other such testing. While the present invention is primarily described below as a device for measuring gaseous pressures on a portion of an airplane, it is appreciated that the scanner 10 can also be used for measuring pressures on other test members, such as portions of other aircraft, spacecraft, watercraft, terrestrial vehicles, stationary structures such as buildings and bridges, and the like.

As illustrated in FIGS. 1 and 3, the scanner 10 includes a manifold 22 that defines a plurality of channels 24. Each channel 24 extends between a port 26 on a first surface 28 of the manifold 22 and a header inlet 30. Tubes 32 can be connected, in turn, to the header inlet 30 of each channel 24, and each tube 32 can extend therefrom to a location on the test member 12 where a pressure measurement is desired, as shown in FIG. 2. Thus, each channel 24 can provide a path of fluid communication that is associated with a respective location for pressure measurement so that the pressure at locations remote from the scanner 10 can be measured at the ports 26 of each channel 24. The manifold 22 is typically formed as a unitary, monolithic member, which can be formed of ceramic or other materials. The channels 24 can extend in a nonlinear configuration through the manifold 22, e.g., so that the ports 26 are disposed on the surface 28 of the manifold 22 that is oblique to the surface 34 at which the header inlets 30 are located. For example, as shown in FIGS. 1 and 3, the manifold 22 can define a cavity 36, and the first surface 28 of the manifold 22 that defines the ports 26 can be disposed in the cavity 36.

The cavity 36 can be partially or entirely defined by a housing or cover 38 (not shown in FIG. 1 for illustrative clarity). For example, as shown in FIG. 3, the housing 38 can be a substantially planar cover that is engaged to the manifold 22 so that the cavity 36 can be substantially hermetically sealed, or related to a reference pressure communicated via any of various reference pressure ports 39a, 39b, 39c. While three reference pressure ports 39a, 39b, 39c are shown, it is appreciated that any of these ports or other ports can be provided and/or used. Alternatively, in the embodiment of FIG. 5, the housing 38 can have a nonplanar shape so that, when the housing 38 is engaged with the manifold 22, the housing 38 and manifold 22 define the cavity 36. In either case, the cavity 36 can be defined proximate the manifold 22 and can be substantially or entirely sealed from an environment outside the cavity 36 of the housing 38, or related to a reference pressure that is communicated via a reference pressure port 39a, 39b, 39c, e.g., through the reference port 39c and through the associated bore 39d that fluidly connects the port 39c to the cavity 36. Thus, a pressure can be provided to the interior of the cavity 36 via one of the reference pressure ports 39a, 39b, 39c so that the internal pressure of the cavity is substantially equal to a reference pressure of a reference pressure device, e.g., a pressure chamber or other device configured to provide a predetermined pressure to the cavity. The manifold 22 and housing 38 can also be rigid members so that the cavity 36 defines a closed, fixed volume of gas that provides a constant reference pressure for a given temperature, or is related to a reference pressure, e.g., via the port 39a, 39b, 39c.

A plurality of pressure sensor elements 40 are provided for detecting pressure at each of the ports 26. That is, one pressure sensor element 40 is typically provided for each port 26 so that each pressure sensor element 40 can determine a pressure at a respective location on the test member 12 that is in communication with the port 26, e.g., via the channels 24 and tubes 32. As shown in FIG. 3, a glass mounting block 42 is mounted on the manifold 22 proximate each port 26, and the mounting block 42 defines an orifice 44 or bore for fluid communication with one of the pressure sensor elements 40 that is disposed on the mounting block 42. Thus, the orifice 44 in the mounting block 42 allows fluid communication between the respective port 26 and the pressure sensor element 40.

Each pressure sensor element 40 includes a body 46 that is disposed on the mounting block 42 opposite the orifice 44 from the port 26. Further, the mounting block 42 and/or the pressure sensor element 40 can define a cavity 48, as shown in FIG. 3, in communication with the respective port 26 and channel 24. The pressure sensor element 40 can also include one or more strain sensors 50, which can be disposed on the body 46 opposite the body 46 from the mounting block 42. Each sensor 50 can be arranged in a Wheatstone bridge configuration, or other configuration associated with other strain sensors or another type of strain or deformation sensor. Alternatively, the sensor 50 can be a piezoelectric device, as is described in Applicant's copending U.S. patent application Ser. No. 11/100,794, titled "Piezoelectric sensor, sensor array, and associated method for measuring pressure," filed Apr. 7, 2005, the entirety of which is incorporated herein by reference. The strain sensor 50 can be electrically connected to an electronic module, described below, e.g., by a wire bond connection.

The strain sensors 50 can be provided proximate a thin portion 52 of the body 46 or a portion that is otherwise made to be at least slightly deformable. The thin or otherwise deformable portion 52 is supported between the reference pressure in the cavity 36 of the manifold 22 and the gaseous pressure in the cavity 48 of the pressure sensor element 40. The reference pressure in the cavity 36 of the manifold 22 is communicated from a reference port 39a, 39b, 39c. Therefore, the thin or otherwise deformable portion 52 of the pressure sensor element 40 is deformed slightly by changes in the differential pressure provided at the respective port 26 and the respective reference port 39a, 39b, 39c. Such deformation results in variation in strain of the strain sensors 50, which provides an analog electrical output signal that varies according to the pressure of the port 26. Further, if all of the pressure sensor elements 40 are disposed in a single cavity 36 as illustrated, the same reference pressure provided on each of the pressure sensor elements 40 can be used for calibrating the pressure sensor elements 40. That is, with a common pressure provided at each of the header inlets 30, and hence all of the ports 26, each of the pressure sensor elements 40 should be disposed between the same reference pressure and port pressure. The pressure sensor elements 40 should typically provide similar output signals in this configuration and, therefore, the pressure sensor elements 40 can easily be calibrated, e.g., by applying an adjustment or correction to the signals output from the scanner 10. Such correction can be performed within the scanner 10 or, more typically, by additional equipment in communication with the scanner 10.

The pressure sensor elements 40 are typically integrated devices that are configured to be non-replaceable. That is, each pressure sensor element 40 can be fixedly and permanently mounted to the respective mounting block 42, e.g., by an adhesive bond or other bond so that the pressure sensor element 40 is fixedly engaged to the mounting block 42. Similarly, the mounting block 42 can be adhesively bonded or otherwise fixedly mounted or joined to the manifold 22 so that the pressure sensor elements 40 are unitary with the manifold 22. Further, the non-replaceable pressure sensor elements 40 can be formed in a small size, i.e., significantly smaller than conventional pressure sensor elements 40 that must be large enough to be easily accessible for handling by a human operator such as for replacement thereof. In this regard, each of the pressure sensor elements 40 of embodiments of the present invention can have a major (i.e., longest) dimension that is shorter than about 0.10 inches and typically about 0.03 inch or less. In this way, the overall dimensions of the scanner 10 can be reduced. For example, the illustrated embodiments of the scanner 10 can have overall dimensions that are about 1.0-2.0 inches in length, 0.5-1.0 inch in width, and 0.05-0.25 inches in thickness. This small size can facilitate the positioning of the scanner 10 in small test members and small internal spaces defined by test members, thereby increasing the potential applicability and usefulness of the scanner 10. The size of the scanner could be made smaller as newer smaller sensors and electronic components are made available.

The manifold 22, mounting block 42, and body 46 of the pressure sensor elements 40 can be formed of materials with similar or corresponding material properties. For example, in one embodiment, the manifold 22 is formed of ceramic, the mounting blocks 42 are formed of glass such as Pyrex® (registered trademark of Corning Incorporated of New York), and the bodies of the pressure sensor elements 40 are formed of silica, each of the materials having similar coefficients of thermal expansion so that variations in temperature cause little or no variation in the strain in the bodies 46 and strain sensors 50. The inside or outside surfaces of the manifold 22 can be coated with a metallic material to provide electromagnetic and electrostatic shielding against external unwanted signals.

The electronic module 60 can also be mounted on or otherwise supported by the manifold 22 and is typically positioned in the cavity 36 of the manifold 22 proximate to the pressure sensor elements 40. The electronic module 60 typically includes a circuit board 62 with various electrical components disposed thereon and electrically conductive tracings 64 on the board 62 for communication between the electrical components. (See exemplary tracings 64 schematically illustrated in FIG. 1.) In particular, the tracings 64 can be electrically connected to the pressure sensor elements 40 by conductive wire bond connections that extend from the strain sensors 50 of each pressure sensor element 40 to a corresponding electrical pad 66 on the circuit board 62. Each wire bond connection can include a connector 68, such as a metal wire or other electrically conductive member, and wire bond connections 70, 72 formed at each end of the connector 68. That is, a first wire bond connection 70 can connect a first end of the connector 68 to the strain sensor 50 of the pressure sensor element 40, and a second wire bond connection 72 can connect the second end of the connector 68 to the conductive pad 66 on the circuit board 62. Each wire bond connection 70, 72 can be formed using friction stir or other form of welding. The electronic module 60 can be electrically connected to the circuit board using a ball grid array joint, i.e., a joint formed by a bead of solder disposed between connecting surfaces, as is conventionally used for mounting an integrated circuit on a circuit board. Such ball grid array joints result in a fixed or permanent connection, i.e., a bond as opposed to a mechanical engagement such as a threaded or cam connection. Although such fixed connections can make replacement of components impractical or impossible, the ball grid array joints can be formed at greatly reduced dimensions compared to conventional mechanical engagements, thereby facilitating a significant reduction in size of the scanner 10.

As schematically illustrated in FIG. 4, the electronic module 60 also includes a plurality of analog-digital (A/D) converters 82. Each A/D converter 82 is configured to communicate with one of the pressure sensor elements 40 and receive an analog signal from the respective pressure sensor element 40 that is representative of the pressure and/or temperature at the corresponding port 26 and, hence, the corresponding header inlet 30 and location of measurement. Each A/D converter 82 processes the analog signal and provides a corresponding electrical digital signal that is also representative of the pressure at the corresponding port 26. The signals from the pressure sensor elements 40 can also be amplified and filtered, before or after digitization. For example, as shown in FIG. 4, each pressure sensor elements 40 is configured to provide an analog output signals to an associated amplifier 80, and the amplifier 80 amplifies and/or filters the analog signal and delivers the amplified/filtered signal to the respective A/D converter 82. Typically, one amplifier/filter 80 and one A/D converter 82 are provided for each pressure sensor element 40 so that the analog signals from the pressure sensor elements 40 are individually amplified and individually converted to digital signals. The amplified, filtered, digital signals can be delivered from the amplifiers 80 and A/D converters 82 to a multiplexer 84, which multiplexes the multiple digital signals and communicates the digital signals via a bus 86 to an output 88 of the electronic module 60.

The output 88 can be in electrical communication with an external processor 90, such as a computer, which can include user input/output devices, such as a video monitor, keyboard, and the like. The processor 90 can include a bus 92 that corresponds to the bus 86 of the electronic module 60. Thus, the output 88 of the electronic module 60 can provide one or more signals representative of the pressures measured by the pressure sensor elements 40 to the computer or other processor 90, which can receive the signals for further processing, analysis, monitoring, storing, communication, and/or other operations. The processor 90 is typically located remotely from the electronic module 60 and the scanner 10. For example, with the scanner 10 disposed in a test member, the computer or other processor 90 can be disposed remotely from the test member at a computer workstation so that an operator can monitor and/or control the workstation and thereby monitor and/or control the operation of the scanner 10. The processor 90 can similarly be connected to any number of additional scanners 10a, 10b, 10c, each of which can be similar to the scanner 10 described above, and which can be configured for measuring pressures at different locations on the test member or other test members. Thus, the processor 90 and scanners 10, 10a, 10b, 10c can, in combination, provide a system 94 for measuring pressures at any number of locations, and additional scanners can be added to the system 94 if additional pressure detection is desired. In some cases, the system 94 can be used to measure pressure at over one thousand different locations on a test member.

In the embodiment shown in FIGS. 1, 3, and 4, the amplifiers and filters 80, A/D converters 82, multiplexer 84, and bus 86 are all part of a single integrated circuit or chip 100. This specialized, unitary chip 100, which can be manufactured specifically for use in the scanner 10, can be a mixed-signal chip that is adapted to perform digital and analog operations, e.g., by processing the analog signals from the pressure sensor elements 40 to provide digital signals, that can also be amplified and/or multiplexed. The size of the scanner 10 can generally be reduced by providing multiple components on the single, integrated chip 100. In some cases, however, some components can be provided separately. For example, as shown in FIGS. 1 and 4, the electronic module can include a temperature sensor 102 and a power module 104 that are provided as separate devices, e.g., by disposing them on the circuit board 62 separately from the chip. Although the power module 104 and temperature sensor 102 are illustrated as separate components in FIG. 4, in other embodiments, the power module 104 and temperature sensor 102 can be provided as integrated elements of the chip 100.

Additionally, the chip 100 can include an extra analog and digital set of circuits corresponding to each pressure analog signal input such that temperature characteristics inherent in each pressure analog signal can be exploited to obtain temperature signals unique to each specific pressure signal. The temperature signals unique to each pressure signal can be converted to digital signals in a similar fashion to the pressure signals and used to accomplish further temperature corrections for each pressure signal.

FIG. 5 illustrates another embodiment of the present invention in which the scanner 10 includes a manifold 22 defining 32 channels 24 and corresponding ports 26 that extend through the circuit board 62. For purposes of illustrative clarity, the scanner 10 is shown with a single pressure sensor element 40 disposed on one of the ports 26, though it is appreciated that the scanner 10 typically includes one pressure sensor element 40 for each port 26, as described above. The amplifier 80 and A/D converter 82 for amplifying and digitizing the output of the pressure sensor element 40 are illustrated as independent electrical components that are disposed on the circuit board 62. Although a single one of the amplifiers 80 and a single one of the A/D converters 82 are shown, it is appreciated that the scanner 10 would typically include multiple amplifiers 80 and A/D converters 82, e.g., one amplifier 80 and/or one A/D converter 82 for each pressure sensor element 40 or for each of multiple groups of pressure sensor elements 40.

In both of the embodiments illustrated in FIGS. 1 and 5, the power module 104 provides power to the electronic module 60 for operation thereof. In particular, the power module 104 can be connected to a remote power source, such as a power source provided by the processor 90, and the power module 104 can provide regulated power to the electronic module 60 for operation of the chip 100 and the like.

The temperature sensor 102 is configured to measure the temperature of the operating environment of the pressure sensor elements 40 such that the signals delivered via the output 88 of the electronic module 60 can be adjusted for variations in temperature. That is, the temperature sensor 102 can be mounted in the cavity 36 of the scanner 10, e.g., on the circuit board 62 and generally proximate to the pressure sensor elements 40 so that the temperature of the temperature sensor 102 varies similarly to the temperature of the pressure sensor elements 40. The temperature sensor 102 provides an electrical signal that is representative of the temperature of the sensor 102, and hence the pressure sensor elements 40, to the electronic module 60. The signal from the temperature sensor 102 can be provided to the electronic module 60 and also to the processor 90 so that the electronic module 60 and/or the processor 90 can monitor the temperature of the pressure sensor elements 40 and determine a temperature correction of the pressures at the header inlets 30 according to the temperature of the pressure sensor elements 40. That is, the electronic module 60 and/or the processor 90 can adjust the pressure measurements according to the measured temperature, e.g., to correct for variations in the operation of the pressure sensor elements 40 that occur due to variations in the temperature. The correction can be performed according to a mathematical formula or algorithm that is developed theoretically or based on empirical test data. It is appreciated that, in other embodiments, the temperature of each sensor can be determined individually and measurement compensations can be performed according to the temperature and pressure of each sensor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A scanner for detecting pressures on a surface of a test member, comprising:
   a manifold defining a plurality of channels, each channel extending between a port on a first surface of the manifold and a header inlet such that each channel is configured to communicate a pressure at a respective one of the header inlets to a respective one of the ports;
   a plurality of pressure sensor elements, each pressure sensor element configured to detect a pressure at a respective one of the ports on the manifold; and
   an electronic module supported by the manifold and configured to communicate with the plurality of pressure sensor elements and an output, the electronic module having at least one A/D converter being configured to communicate with a respective one of the pressure sensor elements and deliver a digital signal to the output representative of the pressure at a respective one of the header inlets.

2. A scanner according to claim 1 wherein the electronic module has a plurality of A/D converters, each A/D converter being configured to communicate with a respective one of the pressure sensor elements and deliver a digital signal to the output representative of the pressure at a respective one of the header inlets.

3. A scanner according to claim 2, further comprising a temperature sensor configured to provide a signal representative of the temperature of the pressure sensor elements to the electronic module for determining a temperature correction of the pressures at the header inlets according to the temperature of the pressure sensor elements.

4. A scanner according to claim 2, further comprising a housing defining a cavity proximate the manifold such that the pressure sensor elements are disposed in the cavity and at least substantially sealed from an environment outside the cavity of the housing such that an internal pressure of the cavity is substantially equal to a reference pressure provided via a reference port fluidly connected to the cavity.

5. A scanner according to claim 2 wherein the A/D converters are defined by a single integrated circuit.

6. A scanner according to claim 2 wherein the electronic module has a plurality of amplifiers, each amplifier being configured to communicate with a respective one of the A/D converters such that each amplifier and the respective A/D converter is configured to deliver an amplified digital signal to the output representative of the pressure at the respective header inlet.

7. A scanner according to claim 6 wherein the A/D converters and the amplifiers are defined by a single integrated circuit.

8. A scanner according to claim 2 wherein the electronic module includes a mixed-signal chip adapted to perform digital and analog operations.

9. A scanner according to claim 2 wherein the electronic module includes a multiplexer configured to multiplex the digital signals from the A/D converters to provide a multiplexed signal via the output.

10. A scanner according to claim 2 wherein each pressure sensor element is fixedly bonded to the electronic module by a wire bond connection.

11. A scanner according to claim 2, further comprising a plurality of tubes extending from the manifold, each tube being fluidly connected to a respective one of the header inlets and extending therefrom to a location remote from the manifold.

12. A scanner according to claim 2 wherein each pressure sensor element is disposed on a glass mounting block mounted on the manifold proximate the respective port, the mounting block defining an orifice for fluid communication between the respective port and the pressure sensor element, and the pressure sensor element defining a body and a strain sensor disposed opposite the body from the mounting block, the strain sensor being electrically connected to the electronic module.

13. A scanner according to claim 2 wherein the manifold defines a ceramic body, each channel extending through the body in a nonlinear configuration between the respective port and header inlet.

14. A method of detecting pressures on a surface of a test member, comprising:
providing a scanner on the test member, the scanner having a manifold defining a plurality of channels, each channel extending between a port on a first surface of the manifold and a header inlet in fluid communication with a plurality of locations on the test member such that each channel is configured to communicate a pressure at a respective one of the locations to a respective one of the ports;
detecting pressures at the ports with a plurality of pressure sensor elements, each pressure sensor element providing an analog signal representative of the pressure at a respective one of the ports;
converting the analog signals to digital signals in at least one A/D converter of an electronic module supported by the manifold, the digital signals being representative of the pressure at each of the header inlets; and
delivering the digital signals to an output of the electronic module.

15. A method according to claim 14 wherein said converting step comprises converting the analog signals to digital signals in a plurality of A/D converters of the electronic module.

16. A method according to claim 15, further comprising generating a signal representative of the temperature of the pressure sensor elements and thereby determining a temperature correction for the pressures at the header inlets according to the temperature of the pressure sensor elements.

17. A method according to claim 15, further comprising providing a housing defining a cavity proximate the manifold such that the pressure sensor elements are disposed in the cavity and at least substantially sealed from an environment outside the cavity of the housing.

18. A method according to claim 15 wherein said converting step comprises converting the analog signals in a single integrated circuit in the electronic module.

19. A method according to claim 15, further comprising amplifying the signals from the pressure sensor elements such that the electronic module provides amplified digital signals at the output.

20. A method according to claim 19 wherein said amplifying step comprises amplifying the signals in a single integrated circuit in the electronic module defining the A/D converters.

21. A method according to claim 15, further comprising performing digital and analog operations on a mixed-signal chip of the electronic module.

22. A method according to claim 15, further comprising multiplexing the digital signals from the A/D converters to provide a multiplexed signal via the output of the electronic module.

23. A method according to claim 15, further comprising fixedly mounting each pressure sensor element to the electronic module by a wire bond connection.

24. A method according to claim 15, disposing each pressure sensor element on a glass mounting block mounted on the manifold proximate the respective port, the mounting block defining an orifice for fluid communication between the respective port and the pressure sensor element, and the pressure sensor element defining a body and a strain sensor disposed opposite the body from the mounting block, the strain sensor being electrically connected to the electronic module.

25. A method according to claim 15, further comprising providing a ceramic block defining the manifold and forming the channels through the manifold in a nonlinear configuration between the respective port and header inlet.

* * * * *